(12) United States Patent
Meng et al.

(10) Patent No.: US 10,715,456 B2
(45) Date of Patent: Jul. 14, 2020

(54) NETWORK DEVICE, CONTROLLER, QUEUE MANAGEMENT METHOD, AND TRAFFIC MANAGEMENT CHIP

(71) Applicant: HUAWEI TECHNOLOGIES CO., LTD., Shenzhen, Guangdong (CN)

(72) Inventors: Fanyu Meng, Nanjing (CN); Qian Cao, Nanjing (CN); Chen Tian, Nanjing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 19 days.

(21) Appl. No.: 16/165,419

(22) Filed: Oct. 19, 2018

(65) Prior Publication Data

US 2019/0068516 A1 Feb. 28, 2019

Related U.S. Application Data

(63) Continuation of application No. PCT/CN2017/080096, filed on Apr. 11, 2017.

(30) Foreign Application Priority Data

Apr. 22, 2016 (CN) .......................... 2016 1 0257533

(51) Int. Cl.
*H04L 12/869* (2013.01)
*H04L 12/863* (2013.01)

(52) U.S. Cl.
CPC .............. *H04L 47/60* (2013.01); *H04L 47/50* (2013.01); *H04L 47/6215* (2013.01)

(58) Field of Classification Search
CPC ..... H04L 47/60; H04L 47/50; H04L 47/6215; H04L 47/62
See application file for complete search history.

(56) References Cited

U.S. PATENT DOCUMENTS 7,321,940 B1 1/2008 Smith et al.
8,069,465 B1 * 11/2011 Bartholomay .......... H04L 47/14
370/395.4

(Continued)

FOREIGN PATENT DOCUMENTS

CN 102594654 A 7/2012
CN 103516622 A 1/2014

(Continued)

*Primary Examiner* — Jay P Patel
(74) *Attorney, Agent, or Firm* — Womble Bond Dickinson (US) LLP

(57) ABSTRACT

This application describes a network device, a controller, a queue management method, and a traffic management chip. The method may be applied to a traffic management chip that uses an HQoS technology, and can include receiving a queue management instruction sent by a controller, where the queue management instruction includes an identifier of a first scheduler and an identifier of a first queue, and the first scheduler is one of multiple first-level schedulers. The method may also include controlling, according to the queue management instruction, scheduling of the first queue by the first scheduler, where a queue scheduled by the first scheduler belongs to a queue resource pool of the TM chip, and the queue resource pool includes at least one to-be-allocated queue. In this application, decoupling between queue allocation and the first-level schedulers is implemented, flexibility of queue allocation is improved, and utilization of queue resources is improved.

19 Claims, 8 Drawing Sheets

(56) References Cited

U.S. PATENT DOCUMENTS

| | | | |
|---|---|---|---|
| 2004/0004972 A1* | 1/2004 | Lakshmanamurthy | H04L 47/50 370/413 |
| 2006/0140201 A1* | 6/2006 | Kumar | H04L 47/15 370/412 |
| 2006/0274754 A1* | 12/2006 | Cho | H04L 12/52 370/392 |
| 2007/0121499 A1* | 5/2007 | Pal | H04L 45/60 370/230 |
| 2012/0327948 A1* | 12/2012 | Mohandoss | H04L 47/21 370/412 |
| 2013/0315054 A1 | 11/2013 | Shamis et al. | |
| 2014/0082616 A1* | 3/2014 | Kurita | G06F 9/455 718/1 |
| 2016/0191406 A1 | 6/2016 | Xiao et al. | |
| 2016/0241481 A1 | 8/2016 | Tal et al. | |
| 2017/0132040 A1* | 5/2017 | Yerfule | H04L 67/1097 |

FOREIGN PATENT DOCUMENTS

| | | |
|---|---|---|
| CN | 103931148 A | 7/2014 |
| CN | 104348750 A | 2/2015 |
| EP | 3029896 A1 | 6/2016 |
| WO | 2015014133 A1 | 2/2015 |

\* cited by examiner

NETWORK DEVICE, CONTROLLER, QUEUE MANAGEMENT METHOD, AND TRAFFIC MANAGEMENT CHIP

CROSS-REFERENCE TO RELATED APPLICATIONS

This application is a continuation of International Application No. PCT/CN2017/080096, filed on Apr. 11, 2017, which claims priority to Chinese Patent Application No. 201610257533.7, filed on Apr. 22, 2016. The disclosures of the aforementioned applications are hereby incorporated by reference in their entireties.

TECHNICAL FIELD

This application relates to the field of network technologies, and in particular, to a network device, a controller, a queue management method, and a traffic management chip.

BACKGROUND

In a quality of service (QoS) technology, data is scheduled according to service quality requirements of different services. During data scheduling, multiple queues are usually used to send data, and different queues have different priorities.

Currently, a new QoS technology, that is, a hierarchical quality of service (HQoS) technology, has emerged. In the technology, hierarchical scheduling is performed on transmission objects such as different users, different services, or even different traffic. Generally, a network device implements a traffic management function by using a traffic management (TM) chip. The TM chip that uses the HQoS technology includes multiple levels of schedulers. Each subsequent-level scheduler is configured to schedule a previous-level scheduler, and each first-level scheduler is configured to schedule multiple queues. For example, the TM chip includes four levels of schedulers. A fourth-level scheduler is configured to schedule multiple third-level schedulers according to a port level, a third-level scheduler is configured to schedule multiple second-level schedulers according to a user group level, a second-level scheduler is configured to schedule multiple first-level schedulers according to a user level, and a first-level scheduler is configured to schedule multiple queues according to a service level. In the prior art, queue allocation is strongly coupled with the first-level scheduler. That is, a fixed quantity of queues are allocated to each first-level scheduler, and each queue is used to send a type of data. For example, eight queues are allocated to each first-level scheduler, and each queue is used to send data of one type of service.

However, when a total quantity of data types is less than a fixed quantity, surplus queues are in an idle state, and a waste of queue resources is caused. When the total quantity of data types is greater than the fixed quantity, multiple different types of data share one queue, and classified scheduling cannot be performed on different types of data.

SUMMARY

Embodiments of this application provide a network device, a controller, a queue management method, and a TM chip, to overcome a problem caused when a fixed quantity of queues are allocated to each first-level scheduler during data scheduling by using an HQoS technology.

A first aspect of this application provides a network device. The network device includes: a first communications interface and a TM chip. The TM chip includes N levels of schedulers, each $(i+1)^{th}$-level scheduler is configured to schedule multiple $i^{th}$-level schedulers, each first-level scheduler is configured to schedule multiple queues, N is an integer greater than 1, and i is an integer greater than or equal to 1 and less than N. The first communications interface is configured to receive a queue management instruction sent by a controller, and the queue management instruction includes an identifier of a first scheduler and an identifier of a first queue, and the first scheduler is one of multiple first-level schedulers. The TM chip is configured to control, according to the queue management instruction, scheduling of the first queue by the first scheduler. A queue scheduled by the first scheduler belongs to a queue resource pool of the TM chip, and the queue resource pool includes at least one to-be-allocated queue.

In a first possible embodiment of the first aspect, the queue management instruction is a queue allocation instruction; and the TM chip is specifically configured to allocate the first queue in the queue resource pool to the first scheduler.

In a second possible embodiment of the first aspect, the queue management instruction is a queue reclamation instruction; and the TM chip is specifically configured to: control the first scheduler to stop scheduling the first queue, and reclaim the first queue to the queue resource pool.

In a third possible embodiment of the first aspect, the queue management instruction is a queue release instruction; and the TM chip is specifically configured to control the first scheduler to temporarily stop scheduling the first queue.

With reference to any one of the first aspect or the possible embodiments of the first aspect, in a fourth possible embodiment of the first aspect, the network device further includes a network processor. The network processor is configured to: receive a packet sent by a server in a wide area network; parse the packet to determine a second scheduler for sending the packet, where the second scheduler is one of the multiple first-level schedulers; search a flow classification table of the second scheduler, to obtain an identifier that is of the second queue and that is corresponding to a data type of the packet; encapsulate the identifier of the second queue to the packet; and send the packet to the TM chip. Each entry in the flow classification table includes a correspondence between a data type and an identifier of a queue. The TM chip is further configured to: read the identifier that is of the second queue and that is carried in the packet, and store the packet to the second queue.

A second aspect of this application provides a controller, where the controller is configured to control a network device to manage a queue, and the network device is the same as the network device provided in the first aspect. The controller includes a second communications interface and a processor. The processor is configured to generate a queue management instruction according to a preset queue management rule, where the queue management instruction includes an identifier of a first scheduler and an identifier of a first queue, and the first scheduler is one of multiple first-level schedulers. The second communications interface is configured to send the queue management instruction to the network device. A queue scheduled by the first scheduler belongs to a queue resource pool of the TM chip, and the queue resource pool includes at least one to-be-allocated queue.

In a first possible embodiment of the second aspect, the queue management instruction is a queue allocation instruction. The processor is specifically configured to: obtain a service request sent by UE; determine, according to a service requested in the service request, the first scheduler for sending a packet of the service; determine, according to a preset queue allocation rule, whether the first queue needs to be allocated to the first scheduler, where the first queue is used to store or send the packet; and if the first queue needs to be allocated to the first scheduler, generate the queue allocation instruction, where the queue allocation instruction includes the identifier of the first scheduler and the identifier of the first queue.

In a second possible embodiment of the second aspect, the queue management instruction is a queue reclamation instruction. The second communications interface is further configured to receive information about queue usage of the first scheduler sent by the TM chip, where the queue usage of the first scheduler includes usage of each queue allocated to the first scheduler. The processor is specifically configured to: detect, according to the queue usage of the first scheduler and a preset queue reclamation rule, whether the first queue that needs to be reclaimed exists; and if the first queue that needs to be reclaimed exists, generate the queue reclamation instruction, where the queue reclamation instruction includes the identifier of the first scheduler and the identifier of the first queue.

In a third possible embodiment of the second aspect, the queue management instruction is a queue release instruction. The second communications interface is further configured to receive information about queue usage of the first scheduler sent by the TM chip, where the queue usage of the first scheduler includes usage of each queue allocated to the first scheduler. The processor is specifically configured to: detect, according to the queue usage of the first scheduler and a preset queue release rule, whether the first queue that needs to be released exists; and if the first queue that needs to be released exists, generate the queue release instruction, where the queue release instruction includes the identifier of the first scheduler and the identifier of the first queue.

A third aspect of this application provides a queue management method, where the method is applied to a TM chip, and the TM chip is the same as the TM chip in the network device provided in the first aspect. The method includes: receiving a queue management instruction sent by a controller, where the queue management instruction includes an identifier of a first scheduler and an identifier of a first queue, and the first scheduler is one of multiple first-level schedulers; and controlling, according to the queue management instruction, scheduling of the first queue by the first scheduler, where a queue scheduled by the first scheduler belongs to a queue resource pool of the TM chip, and the queue resource pool includes at least one to-be-allocated queue.

In a first possible embodiment of the third aspect, the queue management instruction is a queue allocation instruction; and the controlling, according to the queue management instruction, scheduling of the first queue by the first scheduler includes: allocating the first queue in the queue resource pool to the first scheduler.

In a second possible embodiment of the third aspect, the queue management instruction is a queue reclamation instruction; and the controlling, according to the queue management instruction, scheduling of the first queue by the first scheduler includes: controlling the first scheduler to stop scheduling the first queue, and reclaiming the first queue to the queue resource pool.

In a third possible embodiment of the third aspect, the queue management instruction is a queue release instruction; and the controlling, according to the queue management instruction, scheduling of the first queue by the first scheduler includes: controlling the first scheduler to temporarily stop scheduling the first queue.

With reference to any one of the third aspect or the possible embodiments of the third aspect, in a fourth possible embodiment of the third aspect, the method further includes: receiving a packet from a network processor, where the packet is sent by a server in a wide area network to the network processor; reading an identifier that is of a second queue and that is carried in the packet, where the identifier of the second queue is obtained by the network processor by searching, after determining, by parsing the packet, a second scheduler for sending the packet, a flow classification table of the second scheduler according to a data type of the packet, and is encapsulated to the packet by the network processor, the second scheduler is one of the multiple first-level schedulers, and each entry in the flow classification table includes a correspondence between a data type and an identifier of a queue; and storing the packet to the second queue.

A fourth aspect of this application provides a queue management method, where the method is applied to a controller, the controller is configured to control a network device to manage a queue, and the network device is the same as the network device provided in the first aspect. The method includes: generating a queue management instruction according to a preset queue management rule, where the queue management instruction includes an identifier of a first scheduler and an identifier of a first queue, and the first scheduler is one of multiple first-level schedulers; and sending the queue management instruction to the network device, where a queue scheduled by the first scheduler belongs to a queue resource pool of the TM chip, and the queue resource pool includes at least one to-be-allocated queue.

In a first possible embodiment of the fourth aspect, the queue management instruction is a queue allocation instruction; and the generating a queue management instruction according to a preset queue management rule includes: obtaining a service request sent by UE; determining, according to a service requested in the service request, the first scheduler for sending a packet of the service; determining, according to a preset queue allocation rule, whether the first queue needs to be allocated to the first scheduler, where the first queue is used to store or send the packet; and if the first queue needs to be allocated to the first scheduler, generating the queue allocation instruction, where the queue allocation instruction includes the identifier of the first scheduler and the identifier of the first queue.

In a second possible embodiment of the fourth aspect, the queue management instruction is a queue reclamation instruction; and the generating a queue management instruction according to a preset queue management rule includes: receiving information about queue usage of the first scheduler sent by the TM chip, where the queue usage of the first scheduler includes usage of each queue allocated to the first scheduler; detecting, according to the queue usage of the first scheduler and a preset queue reclamation rule, whether the first queue that needs to be reclaimed exists; and if the first queue that needs to be reclaimed exists, generating the queue reclamation instruction, where the queue reclamation instruction includes the identifier of the first scheduler and the identifier of the first queue.

In a third possible embodiment of the fourth aspect, the queue management instruction is a queue release instruction; and the generating a queue management instruction according to a preset queue management rule includes: receiving information about queue usage of the first scheduler sent by the TM chip, where the queue usage of the first scheduler includes usage of each queue allocated to the first scheduler; detecting, according to the queue usage of the first scheduler and a preset queue release rule, whether the first queue that needs to be released exists; and if the first queue that needs to be released exists, generating the queue release instruction, where the queue release instruction includes the identifier of the first scheduler and the identifier of the first queue.

A fifth aspect of this application provides a TM chip, where the TM chip includes at least one component, and the at least one component is configured to implement the queue management method provided in any one of the third aspect or the possible implementations of the third aspect.

In this application, the TM chip receives the queue management instruction sent by the controller, and controls, according to the queue management instruction, scheduling of the first queue by the first scheduler. This resolves a prior-art problem caused when a fixed quantity of queues are allocated to each first-level scheduler during data scheduling by using an HQoS technology. Because the multiple first-level schedulers in the TM chip schedule queues from a shared queue resource pool, queue allocation and the first-level schedulers are decoupled, and the first-level schedulers may schedule expected quantities of queues and expected types of queues according to an actual requirement from the shared queue resource pool. When a newly added type of data needs to be transmitted, a queue is scheduled from the shared queue resource pool. When there is an idle queue, the idle queue may be reclaimed to the shared queue resource pool. Therefore, the network device provided in this embodiment implements decoupling between queue allocation and the first-level schedulers, improves flexibility of queue allocation, and improves utilization of queue resources.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

To make the objectives, technical solutions, and advantages of this application clearer, the following further describes the embodiments of this application in detail with reference to the accompanying drawings.

"Component" mentioned in this specification is a functional structure divided according to logic, and the "component" may be implemented only by hardware, or by a combination of hardware and software.

"At least one" mentioned in this specification means one or more, and "multiple" means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
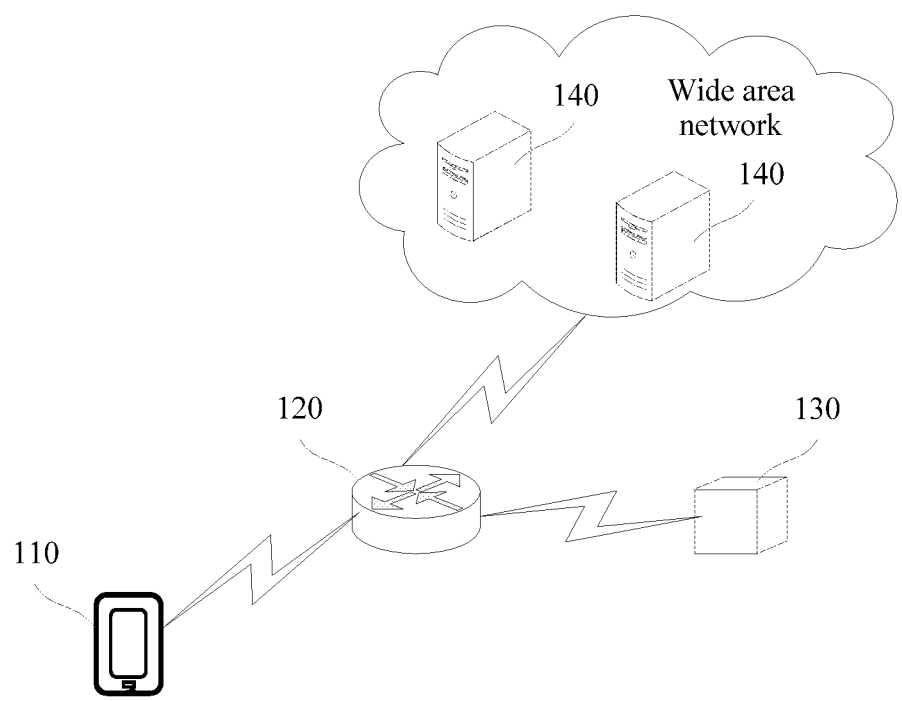
FIG. 1 is a schematic diagram of an environment according to an embodiment of this application.

Referring to FIG. 1, FIG. 1 shows a schematic diagram of an environment according to an embodiment of this application. The environment may be a network system that provides various network services for a user. For example, as shown in FIG. 1, the environment includes: user equipment (UE) 110, a network device 120, a controller 130, and at least one server 140.

The UE 110 may be a mobile phone, a tablet computer, a personal computer (PC), a multimedia playing device, or the like. The UE 110 communicates with the network device 120 by using a network. The network may be an operator network, or may be a local area network.

The network device 120 may be a router, a switch, a bridge, a wavelength division multiplexing device, a packet transport network device, an optical transport network device, a firewall, a data center, or the like. In this embodiment of this application, that the network device 120 is a traffic control gateway is used as an example.

The network device 120 includes a first communications interface, a TM chip, and a network processor. The TM chip is connected to the network processor by using a bus. The bus may be a peripheral component interconnect (PCI) bus, an extended industry standard architecture (EISA) bus, or the like. The bus may be classified into an address bus, a data bus, a control bus, and the like. The network device 120 communicates with an external device by using the first communications interface. The first communications interface may be one communications interface, and the TM chip and the network processor share a same communications interface to communicate with the external device. Alternatively, the first communications interface may include multiple communications interfaces, and the TM chip and the network processor may separately use different communications interfaces to communicate with the external device. The TM chip is configured to implement a traffic management function. The network processor is configured to: receive, by using the first communications interface, a packet sent by the external device, and perform corresponding processing on the packet. For example, the network processor receives a request packet that is sent by the UE 110 and that is used to request the server 140 for service data, and forwards the request packet to the controller 130 and the server 140. For another example, the network processor receives a packet that is fed back by the server 140 and that carries the service data, and stores or sends the packet.

Generally, the controller 130 is a device independent of the network device 120. One controller 130 may manage one or more network devices 120, and provide different configuration for each network device 120. The controller 130 may be a software-defined networking (SDN) controller. The controller 130 is configured to send a queue management instruction to the TM chip, and the TM chip manages, according to the queue management instruction, a queue scheduled by a target scheduler. The network device 120 may communicate with the controller 130 by using a network. The controller 130 includes a second communications interface and a processor. The controller 130 communicates with the external device by using the second communications interface. The processor is configured to perform all functions of the controller 130.

The server 140 is deployed in a wide area network. The server 140 is configured to provide a network service for a user. Different servers 140 may provide a same type of network service or different types of network services for the user. In this embodiment of this application, a type of a network service is not limited. For example, the network service includes but is not limited to a Voice over Internet Protocol (VoIP) service, a video on demand (VOD) service, a broadband TV (BTV) service, a home information system (HIS) service, and a common Internet service (for example, an e-mail service). Data transmitted between the server 140 and the UE 110 is forwarded by using the network device 120.

Figure 2A:
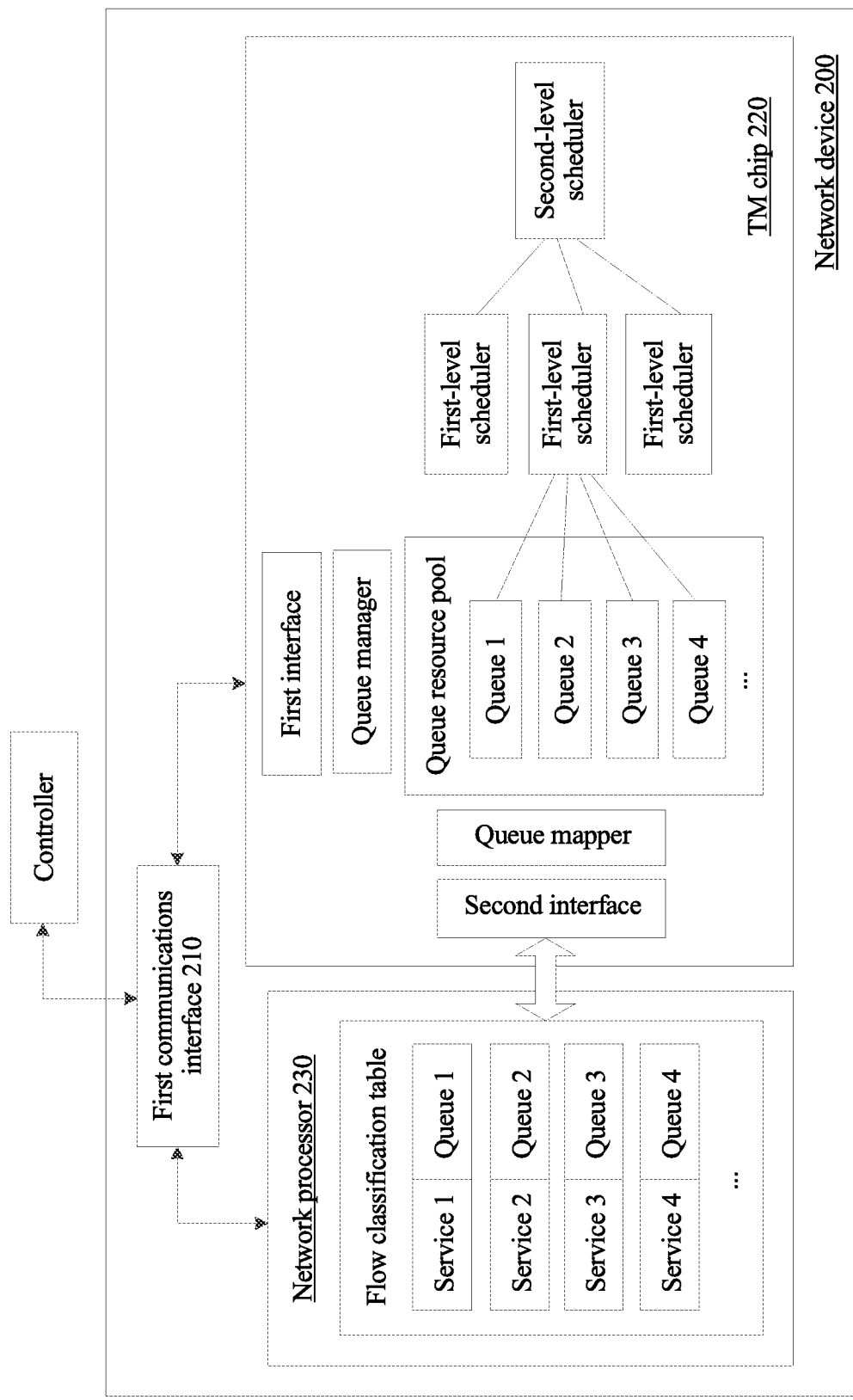
FIG. 2A is a block diagram of a network device according to an embodiment of this application.

Referring to FIG. 2A, FIG. 2A shows a block diagram of a network device according to an embodiment of this application. The network device 200 includes a first communications interface 210, a TM chip 220, and a network processor 230.

The TM chip 220 includes N levels of schedulers. Each $(i+1)^{th}$-level scheduler is configured to schedule multiple $i^{th}$-level schedulers, and each first-level scheduler is configured to schedule multiple queues. N is an integer greater than 1, and i is an integer greater than or equal to 1 and less than N. In actual application, a level of a scheduler may be set according to an actual requirement.

Figure 2B:
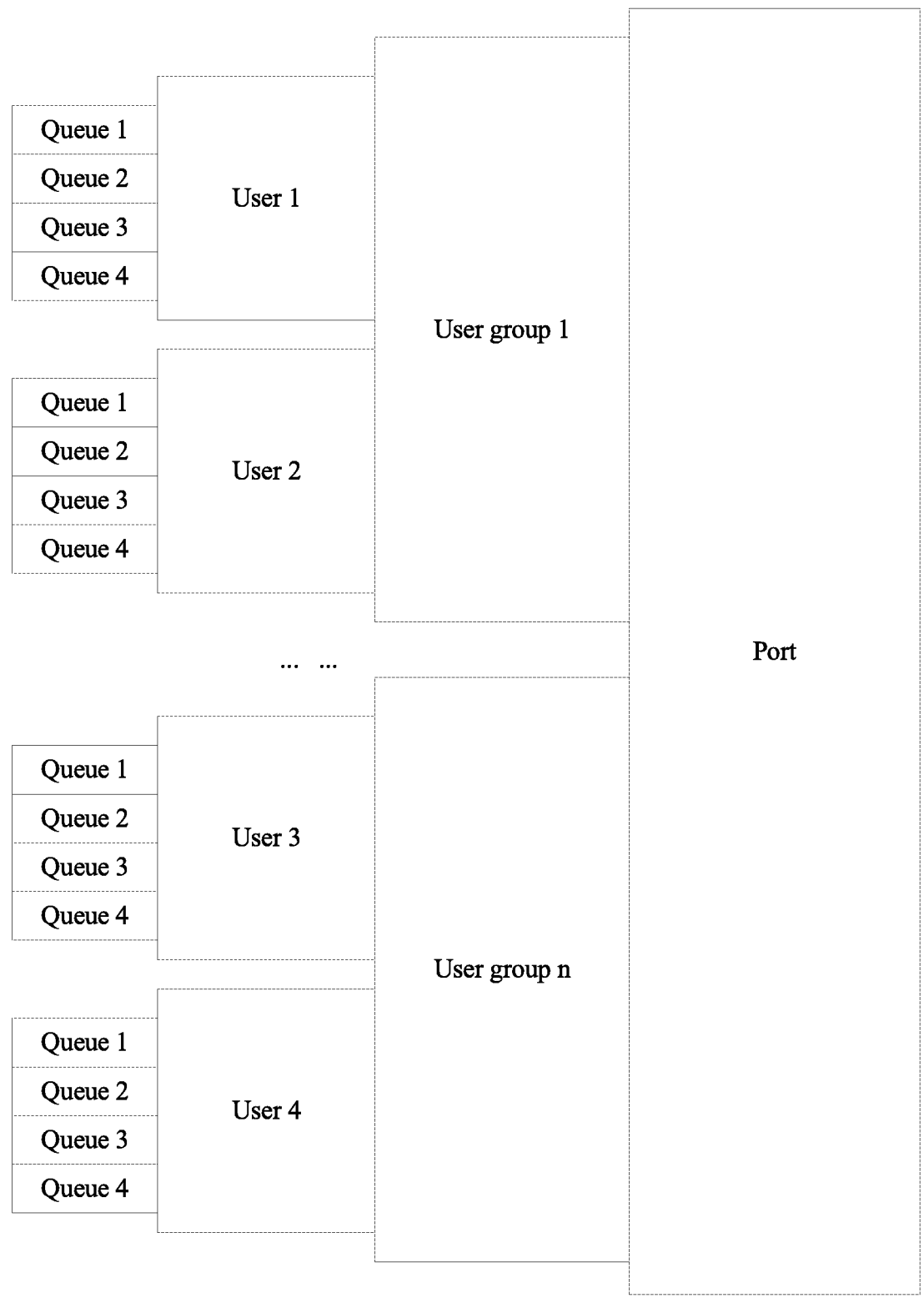
FIG. 2B is a schematic diagram of a hierarchical scheduling model.

FIG. 2B is a schematic diagram of a hierarchical scheduling model. The hierarchical scheduling model shown in FIG. 2B includes four levels of schedulers. A scheduling level may include a port level, a user group level, a user level, and a service level. Each fourth-level scheduler is configured to schedule multiple third-level schedulers according to the port level; each third-level scheduler is configured to schedule multiple second-level schedulers according to the user group level; each second-level scheduler is configured to schedule multiple first-level schedulers according to the user level; and each first-level scheduler is configured to schedule multiple queues according to the service level.

Figure 2C:
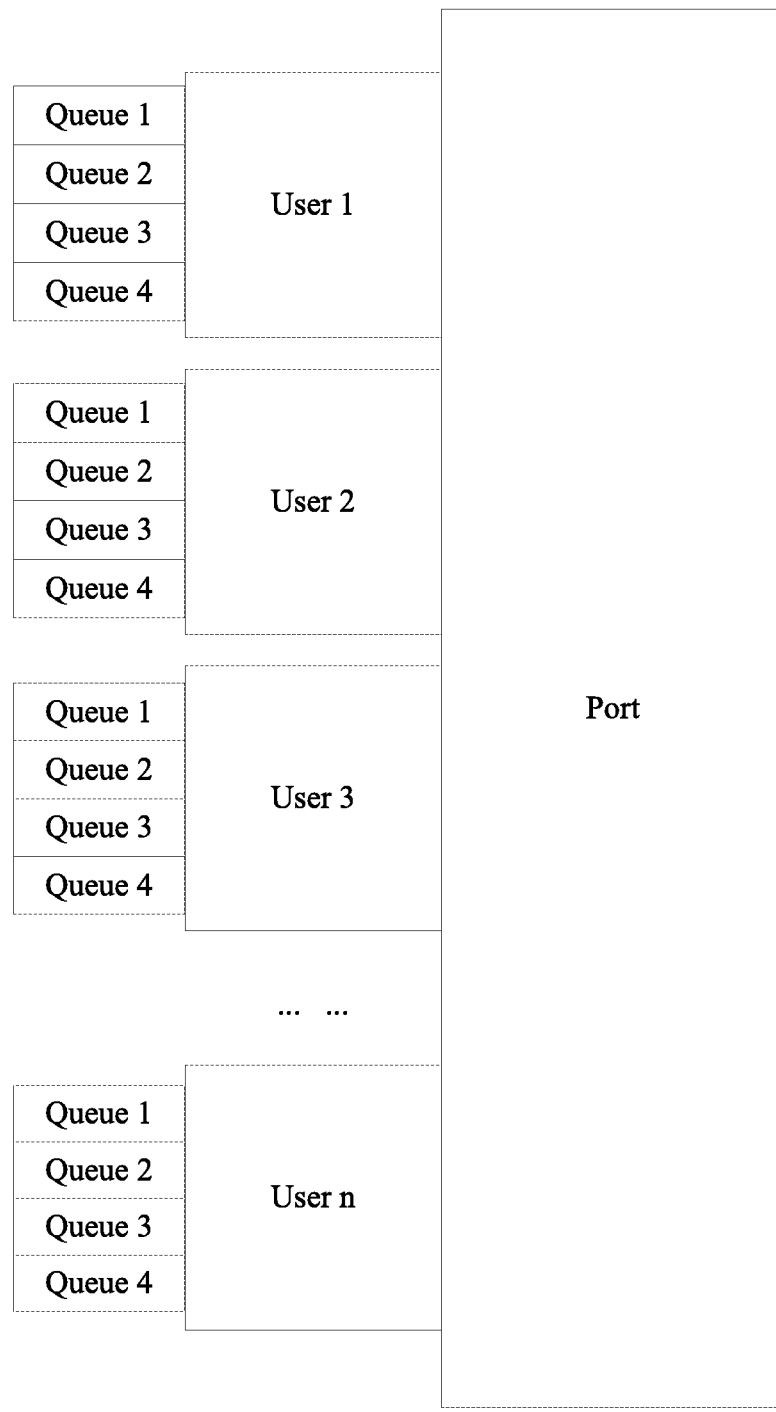
FIG. 2C is a schematic diagram of another hierarchical scheduling model.

FIG. 2C is a schematic diagram of another hierarchical scheduling model. The hierarchical scheduling model shown in FIG. 2C includes three levels of schedulers, and scheduling levels may include three levels: a port level, a user level, and a service level. Each third-level scheduler is configured to schedule multiple second-level schedulers according to the port level; each second-level scheduler is configured to schedule multiple first-level schedulers according to the user level; and each first-level scheduler is configured to schedule multiple queues according to the service level.

The first communications interface 210 is configured to receive a queue management instruction sent by a controller, where the queue management instruction includes an identifier of a first scheduler and an identifier of a first queue, and the first scheduler is one of the multiple first-level schedulers. The identifier of the scheduler is used to uniquely identify the scheduler. The identifier of the scheduler may be a name of the scheduler, may be a sequence number allocated to the scheduler, or may be another unique identifier. The identifier of the queue is used to uniquely identify the queue. The identifier of the queue may be a name of the queue, may be a sequence number allocated to the queue, or may be another unique identifier. A queue scheduled by the first scheduler belongs to a queue resource pool of the TM chip 220, and the queue resource pool includes at least one to-be-allocated queue. That is, the queue resource pool includes at least one to-be-allocated queue that can be scheduled by each first-level scheduler. Identifiers of queues in the queue resource pool are different from each other.

The TM chip 220 is further configured to control, according to the queue management instruction, scheduling of the first queue by the first scheduler. The following separately gives description from three aspects: allocation, reclamation, and release.

In a possible embodiment, the queue management instruction is a queue allocation instruction, and the queue allocation instruction includes the identifier of the first scheduler and the identifier of the first queue. The TM chip 220 is specifically configured to allocate the first queue in the queue resource pool to the first scheduler. The first queue is a to-be-allocated queue in the queue resource pool, that is, a queue that is not allocated to the first-level scheduler. In an embodiment of an actual implementation process, the queue resource pool is corresponding to a first queue list, and the first queue list records identifiers of all to-be-allocated queues included in the queue resource pool. For example, the first queue list includes: at least one identifier of a class selector (CS) queue, at least one identifier of an assured forwarding (AF) queue, at least one identifier of an expedited forwarding (EF) queue, and at least one identifier of a best effort (BE) queue. Each first-level scheduler is corresponding to a second queue list, and the second queue list corresponding to each first-level scheduler records an identifier of a queue allocated to the first-level scheduler. Each first-level scheduler has permission for scheduling queues included in the second queue list corresponding to each first-level scheduler. In an allocation process, the TM chip 220 may be configured to: indicate, in the first queue list, that the first queue has been allocated, and add the identifier of the first queue to the second queue list corresponding to the first scheduler. The indicating, in the first queue list, that the first queue has been allocated may be deleting the identifier of the first queue from the first queue list, or may be setting, in the first queue list, a corresponding identifier for the first queue to indicate that the first queue has been allocated, or the like. Optionally, the TM chip 220 is further configured to send a scheduling notification to the first scheduler, and the scheduling notification is used to instruct the first scheduler to start to schedule the first queue.

In another possible embodiment, the queue management instruction is a queue reclamation instruction, and the queue reclamation instruction includes the identifier of the first scheduler and the identifier of the first queue. The TM chip 220 is specifically configured to control the first scheduler to stop scheduling the first queue, and reclaim the first queue to the queue resource pool. In one embodiment of an implementation process, the TM chip 220 may be configured to delete the identifier of the first queue from the second queue list corresponding to the first scheduler, and indicate, in the first queue list, that the first queue is to be allocated. The indicating, in the first queue list, that the first queue is to be allocated may be adding the identifier of the first queue to the first queue list, or may be setting, in the first queue list, a corresponding identifier for the first queue to indicate that the first queue is to be allocated, or the like.

In another possible embodiment, the queue management instruction is a queue release instruction, and the queue release instruction includes the identifier of the first scheduler and the identifier of the first queue. The TM chip 220 is specifically configured to control the first scheduler to temporarily stop scheduling the first queue. In an embodiment of an actual implementation process, the TM chip 220 may be configured to send a release notification to the first scheduler, and the release notification is used to instruct the first scheduler to temporarily stop scheduling the first queue. Alternatively, the TM chip 220 may be configured to set, in the second queue list corresponding to the first scheduler, a corresponding identifier for the first queue to instruct to temporarily stop scheduling. By controlling the first scheduler to temporarily stop scheduling the first queue, the TM chip 220 releases the first queue when the first queue is temporarily not required to send data, and does not need to re-schedule the first queue from the queue resource pool when the first queue is required to send data again. This implements quick recovery of scheduling of the first queue, and helps save processing resources of the TM chip 220.

The network processor 230 is configured to: receive a packet sent by a server in a wide area network; parse the packet to determine a second scheduler for sending the packet; search a flow classification table of the second scheduler, to obtain an identifier that is of the second queue and that is corresponding to a data type of the packet; encapsulate the identifier of the second queue to the packet; and send the packet to the TM chip 220. The TM chip 220 is further configured to: receive the packet sent by the network processor 230, read the identifier that is of the second queue and that is carried in the packet, and store the packet to the second queue.

The second scheduler is one of the multiple first-level schedulers. Each entry in the flow classification table includes a correspondence between a data type and an identifier of a queue, and the correspondence included in the flow classification table is adjustable. The data type is a type of data transmitted in a network by using the network device 200. Generally, data may be classified according to a network service type. For example, data of different types of network services such as a VoIP service, a VOD service, a BTV service, an HIS service, and a common Internet service is separately corresponding to different data types. Optionally, data may be classified according to a traffic type. For example, control data traffic and service data traffic are separately corresponding to different data types. Certainly, in another possible embodiment, a data type may be further classified with reference to the network service type and the traffic type. For example, data of different traffic types of a same service is separately corresponding to different data types.

That data is classified according to the network service type is used as an example. If it is assumed that the network device 200 transmits a packet of an over the top (OTT) video service, and a queue corresponding to the OTT video service recorded in the flow classification table is an AF4 queue, the network processor 230 encapsulates an identifier of the AF4 queue to the packet, and then sends the encapsulated packet to the TM chip 220. The TM chip 220 receives the packet sent by the network processor 230, reads the identifier that is of the AF4 queue and that is carried in the packet, and stores, according to the identifier of the AF4 queue, the packet to the AF4 queue scheduled by the second scheduler.

Optionally, the controller is further configured to pre-deliver a flow classification table corresponding to the second scheduler to the network processor 230. The pre-delivered flow classification table includes at least one preset correspondence between a data type and an identifier of a queue. For different first-level schedulers, correspondences included in the pre-delivered flow classification table may be the same, or may be different, and a corresponding rule may be pre-configured in the controller. In a possible embodiment, a preset data type may include data types corresponding to one or more basic network services (for example, a common Internet service).

Optionally, the controller is further configured to send a flow classification table update indication to the network processor 230. The flow classification table update indication includes an identifier of the second scheduler, and a correspondence between an identifier of a to-be-updated queue and a data type. The network processor 230 is configured to: receive the flow classification table update indication sent by the controller, obtain, according to the identifier of the second scheduler, the flow classification table corresponding to the second scheduler, and update, in the flow classification table, the correspondence between the identifier of the to-be-updated queue and the data type. The updating, in the flow classification table, the correspondence between an identifier of a to-be-updated queue and a data type includes: if the flow classification table does not include the identifier of the to-be-updated queue, adding, to the flow classification table, the correspondence between the identifier of the to-be-updated queue and the data type; or if the flow classification table includes the identifier of the to-be-updated queue, changing an original data type corresponding to the identifier of the to-be-updated queue to a data type included in the flow classification table update indication.

Optionally, as shown in FIG. 2A, the TM chip 220 includes a first interface, a queue manager, a second interface, and a queue mapper. The queue manager is configured to manage a queue, including allocation, reclamation, and release of the queue. The first interface is configured to: feed back information about queue usage to the controller, and receive the queue management instruction sent by the controller. The second interface is configured to communicate with the network processor 230, including: receiving the packet sent by the network processor 230. The queue mapper is configured to store the packet sent by the network processor 230 to a corresponding queue.

It should be noted that, generally, the TM chip 220 maintains only one queue resource pool, and all the first-level schedulers included in the TM chip 220 schedule queues from the queue resource pool, that is, all the first-level schedulers share one queue resource pool. Certainly, in another possible embodiment, alternatively, the TM chip 220 may maintain multiple queue resource pools, and some of the first-level schedulers in the TM chip 220 schedule queues from each queue resource pool.

In addition, generally, cache space corresponding to each queue is fixed. Certainly, in another possible embodiment, multiple queues may share cache space. For example, a size of cache space corresponding to a queue 1 is a bytes, and a size of cache space corresponding to a queue 2 is b bytes. If the queue 1 and the queue 2 share cache space, when data stored in one of the queues exceeds the size of the cache space of the queue, the data may be stored to the cache space of another queue. In the foregoing manner, packet loss caused by an insufficient queue depth may be reduced, and cache space is more effectively used.

In this embodiment, only a processing process performed by the network device 200 after the network device 200 receives the queue management instruction from the controller is described, and for a processing process in which the controller generates the queue management instruction, refer to description in the following embodiment shown in FIG. 3.

In conclusion, according to the network device provided in this embodiment, the TM chip receives, by using the first communications interface, the queue management instruction sent by the controller, and controls, according to the queue management instruction, scheduling of the first queue by the first scheduler. This resolves a prior-art problem caused when a fixed quantity of queues are allocated to each first-level scheduler during data scheduling by using an HQoS technology. Because the multiple first-level schedulers in the TM chip schedule queues from a shared queue resource pool, queue allocation and the first-level schedulers are decoupled, and the first-level schedulers may schedule expected quantities of queues and expected types of queues according to an actual requirement from the shared queue resource pool. When a newly added type of data needs to be transmitted, a queue is scheduled from the shared queue resource pool. When there is an idle queue, the idle queue may be reclaimed to the shared queue resource pool. Therefore, the network device provided in this embodiment implements decoupling between queue allocation and the first-level schedulers, improves flexibility of queue allocation, and improves utilization of queue resources.

Another embodiment provided based on the embodiment shown in FIG. 2A provides a TM chip. As shown in FIG. 2A, the TM chip 220 includes a first interface and a queue manager.

The first interface is configured to receive a queue management instruction sent by a controller, where the queue management instruction includes an identifier of a first scheduler and an identifier of a first queue, and the first scheduler is one of multiple first-level schedulers.

The queue manager is configured to control, according to the queue management instruction, scheduling of the first queue by the first scheduler.

A queue scheduled by the first scheduler belongs to a queue resource pool of the TM chip 220, and the queue resource pool includes at least one to-be-allocated queue.

In a first possible embodiment, the queue management instruction is a queue allocation instruction. The queue manager is specifically configured to allocate the first queue in the queue resource pool to the first scheduler.

In a second possible embodiment, the queue management instruction is a queue reclamation instruction. The queue manager is specifically configured to: control the first scheduler to stop scheduling the first queue, and reclaim the first queue to the queue resource pool.

In a third possible embodiment, the queue management instruction is a queue release instruction. The queue manager is specifically configured to control the first scheduler to temporarily stop scheduling the first queue.

Optionally, as shown in FIG. 2A, the TM chip 220 further includes a second interface and a queue mapper.

The second interface is configured to receive a packet from a network processor 230, where the packet is sent by a server in a wide area network to the network processor 230.

The queue mapper is configured to read an identifier that is of a second queue and that is carried in the packet. The identifier of the second queue is obtained by the network processor 230 by searching, after determining, by parsing the packet, a second scheduler for sending the packet, a flow classification table of the second scheduler according to a data type of the packet, and is encapsulated to the packet by the network processor 230. The second scheduler is one of multiple first-level schedulers, and each entry in the flow classification table includes a correspondence between a data type and an identifier of a queue.

The queue mapper is further configured to store the packet to the second queue corresponding to the second scheduler.

It should be noted that implementation of functions of the TM chip provided in this embodiment by the TM chip is merely described by using division of the foregoing functional components as an example. In actual application, the foregoing functions may be allocated to different functional components according to requirements for implementation, that is, an internal structure of the TM chip is divided into different functional components, so as to implement all or some of the functions described above.

Figure 3:
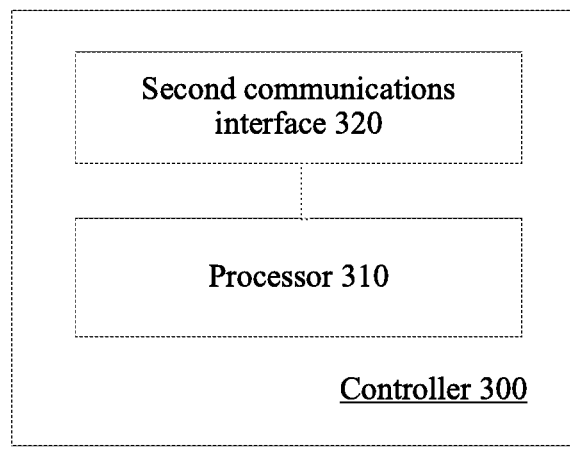
FIG. 3 is a block diagram of a controller according to an embodiment of this application.

Referring to FIG. 3, FIG. 3 shows a block diagram of a controller according to an embodiment of this application. The controller 300 is configured to control a network device to manage a queue, and the network device is the same as the network device described in the embodiment shown in FIG. 2A. As shown in FIG. 3, the controller 300 includes a processor 310 and a second communications interface 320.

The processor 310 is configured to generate a queue management instruction according to a preset queue management rule. The queue management instruction includes an identifier of a first scheduler and an identifier of a first queue, and the first scheduler is one of multiple first-level schedulers included in a TM chip of a network device. The second communications interface 320 is configured to send the queue management instruction to the network device.

The following separately gives description from three aspects: allocation, reclamation, and release.

In a possible embodiment, the queue management instruction is a queue allocation instruction, and the queue allocation instruction includes the identifier of the first scheduler and the identifier of the first queue. The processor 310 is specifically configured to: obtain a service request sent by UE; determine, according to a service requested in the service request, the first scheduler for sending a packet of the service; determine, according to a preset queue allocation rule, whether the first queue needs to be allocated to the first scheduler, where the first queue is used to store or send the packet; and if the first queue needs to be allocated to the first scheduler, generate the queue allocation instruction, where the queue allocation instruction includes the identifier of the first scheduler and the identifier of the first queue.

The service requested in the service request may be a VoIP service, a VOD service, a BTV service, an HIS service, an OTT service, or the like. This is not limited in this embodiment. The queue allocation rule may be preset in the controller according to an actual requirement.

For example, the queue allocation rule is set to: when a data type of a packet of the service requested in the service request is a newly added data type, allocating the first queue to the first scheduler. After determining, according to the service requested in the service request, the first scheduler for sending the packet of the service, the controller obtains a queue allocated to the first scheduler. The controller may obtain, according to a flow classification table of the first scheduler, the queue allocated to the first scheduler; or the controller may receive information about queue usage of the first scheduler sent by the TM chip, where the queue usage of the first scheduler includes usage of each queue allocated to the first scheduler. Then, the controller detects whether there is a queue for storing or sending the packet (that is, the packet of the service requested in the service request). If there is a queue for storing or sending the packet in the queues allocated to the first scheduler, a new queue does not need to be allocated to the first scheduler; or if there is no queue for storing or sending the packet in the queues allocated to the first scheduler, the first queue is allocated to the first scheduler. For example, data is classified according to a network service type. If it is assumed that the service requested in the service request is an OTT video service, the controller detects whether there is a queue for storing or sending a packet of the OTT video service in the queues allocated to the first scheduler. When a detection result is that there is no queue for storing or sending the packet of the OTT video service in the queues allocated to the first scheduler, the first queue (for example, an AF4 queue) is allocated to the first scheduler for storing or sending the packet of the OTT video service. A mapping correspondence between a data type of the packet and a queue for storing or sending the packet may be pre-configured in the controller.

For another example, the queue allocation rule is set to: when a data type of a packet of the service requested in the service request is a newly added data type, and a priority of the service is higher than a preset priority, allocating the first queue to the first scheduler.

For another example, the queue allocation rule is set to: when a data type of a packet of the service requested in the service request is a newly added data type, and the first scheduler currently has no idle queue, allocating the first queue to the first scheduler. The controller may determine, according to the queue usage of the first scheduler, whether the first scheduler currently has an idle queue.

Certainly, the foregoing queue allocation rule is merely an example and explanatory. In actual application, a queue allocation rule that meets an actual requirement may be set.

In another possible embodiment, the queue management instruction is a queue reclamation instruction, and the queue reclamation instruction includes the identifier of the first scheduler and the identifier of the first queue. The second communications interface 320 is further configured to receive information about queue usage of the first scheduler sent by the TM chip, where the queue usage of the first scheduler includes usage of each queue allocated to the first scheduler. The processor 310 is specifically configured to: detect, according to the queue usage of the first scheduler and a preset queue reclamation rule, whether the first queue that needs to be reclaimed exists; and if the first queue that needs to be reclaimed exists, generate the queue reclamation instruction. The queue reclamation rule may be preset in the controller according to an actual requirement.

For example, the queue reclamation rule is set to: when the first scheduler has an idle queue, reclaiming the idle queue to a queue resource pool. The idle queue is a queue in which no packet is currently stored or sent. If it is assumed that the controller detects that an AF2 queue of the first scheduler is an idle queue, a queue reclamation instruction is generated. The queue reclamation instruction includes the identifier of the first scheduler and an identifier of the AF2 queue.

For another example, the queue reclamation rule is set to: when the first scheduler has an idle queue, and a quantity of remaining to-be-allocated queues in the queue resource pool is less than a preset quantity, reclaiming the idle queue to the queue resource pool. The quantity of the remaining to-be-allocated queues in the queue resource pool may be obtained by the TM chip and sent to the controller.

For another example, the queue reclamation rule is set to: when the first scheduler has an idle queue, and a priority corresponding to the first scheduler is lower than a preset priority, reclaiming the idle queue to the queue resource pool.

Certainly, the foregoing queue reclamation rule is merely an example and explanatory. In actual application, a queue reclamation rule that meets an actual requirement may be set.

In another possible embodiment, the queue management instruction is a queue release instruction, and the queue release instruction includes the identifier of the first scheduler and the identifier of the first queue. The second communications interface 320 is further configured to receive information about queue usage of the first scheduler sent by the TM chip, where the queue usage of the first scheduler includes usage of each queue allocated to the first scheduler. The processor 310 is specifically configured to: detect, according to the queue usage of the first scheduler and a preset queue release rule, whether the first queue that needs to be released exists; and if the first queue that needs to be released exists, generate the queue release instruction. The queue release rule may be preset in the controller according to an actual requirement.

For example, the queue release rule is set to: when the first scheduler has an idle queue, releasing the idle queue.

For another example, the queue release rule is set to: when the first scheduler has an idle queue, and a quantity of remaining to-be-allocated queues in the queue resource pool is greater than a preset quantity, releasing the idle queue.

For another example, the queue release rule is set to: when the first scheduler has an idle queue, and a priority corresponding to the first scheduler is higher than a preset priority, releasing the idle queue.

Certainly, the foregoing queue release rule is merely an example and explanatory. In actual application, a queue release rule that meets an actual requirement may be set.

Figure 4:
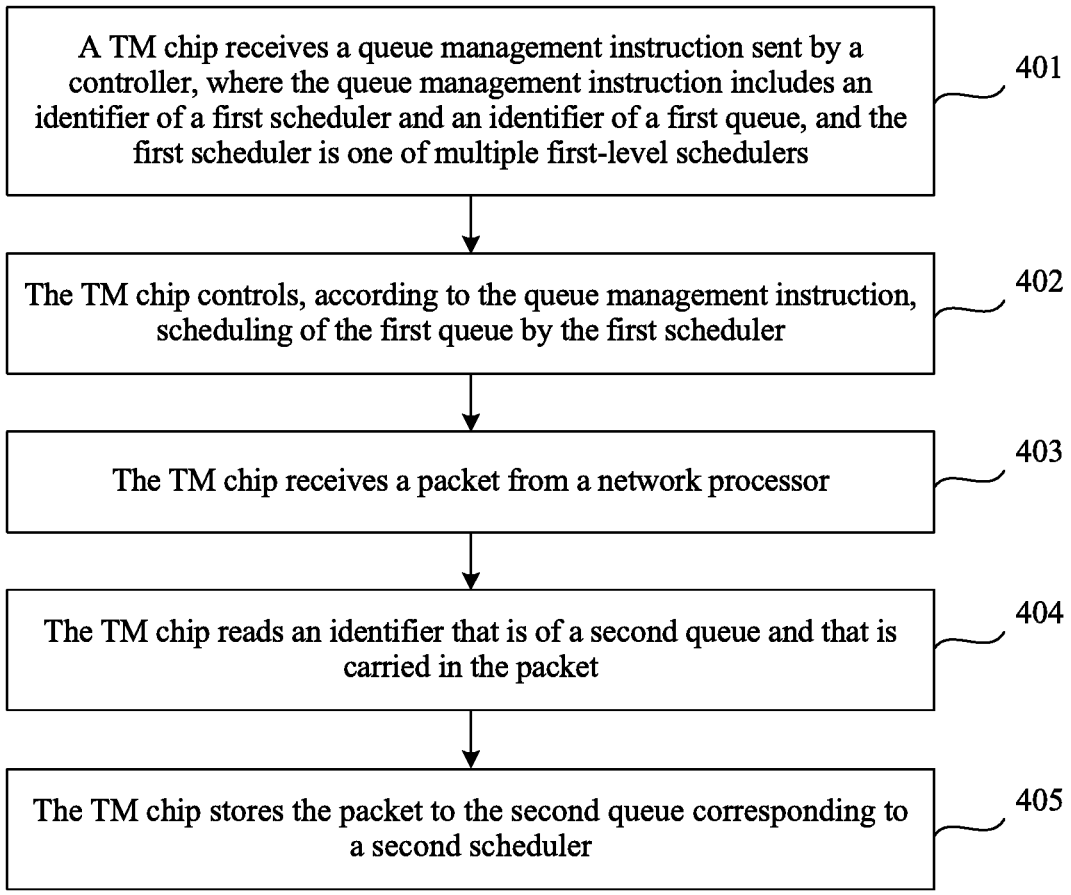
FIG. 4 is a flowchart of a queue management method according to an embodiment of this application.

Referring to FIG. 4, FIG. 4 shows a flowchart of a queue management method according to an embodiment of this application. The method is applied to the TM chip described in the embodiment shown in FIG. 2A. For a structure of the TM chip, refer to description in the embodiment shown in FIG. 2A and the hierarchical scheduling models that are shown in FIG. 2B and FIG. 2C as examples, and details are not described again in this embodiment. The method provided in this embodiment may include the following steps.

Step 401: A TM chip receives a queue management instruction sent by a controller, where the queue management instruction includes an identifier of a first scheduler and an identifier of a first queue, and the first scheduler is one of multiple first-level schedulers.

The identifier of the scheduler is used to uniquely identify the scheduler. The identifier of the scheduler may be a name of the scheduler, may be a sequence number allocated to the scheduler, or may be another unique identifier. The identifier of the queue is used to uniquely identify the queue. The identifier of the queue may be a name of the queue, may be a sequence number allocated to the queue, or may be another unique identifier. A queue scheduled by the first scheduler belongs to a queue resource pool of the TM chip, and the queue resource pool includes at least one to-be-allocated queue. That is, the queue resource pool includes at least one to-be-allocated queue that can be scheduled by each first-level scheduler. Identifiers of queues in the queue resource pool are different from each other.

Step 402: The TM chip controls, according to the queue management instruction, scheduling of the first queue by the first scheduler.

The following separately gives description from three aspects: allocation, reclamation, and release.

In a possible embodiment, the queue management instruction is a queue allocation instruction, and the queue allocation instruction includes the identifier of the first scheduler and the identifier of the first queue. The TM chip allocates the first queue in the queue resource pool to the first scheduler. The first queue is a to-be-allocated queue in the queue resource pool, that is, a queue that is not allocated to the first-level scheduler. In an embodiment of an actual implementation process, the queue resource pool is corresponding to a first queue list, and the first queue list records identifiers of all to-be-allocated queues included in the queue resource pool. For example, the first queue list includes at least one identifier of a CS queue, at least one identifier of an AF queue, at least one identifier of an EF queue, and at least one identifier of a BE queue. Each first-level scheduler is corresponding to a second queue list, and the second queue list corresponding to each first-level scheduler records an identifier of a queue allocated to the first-level scheduler. Each first-level scheduler has permission for scheduling queues included in the second queue list corresponding to each first-level scheduler. In an allocation process, the TM chip indicates, in the first queue list, that the first queue has been allocated, and adds the identifier of the first queue to the second queue list corresponding to the first scheduler. The indicating, in the first queue list, that the first queue has been allocated may be deleting the identifier of the first queue from the first queue list, or may be setting, in the first queue list, a corresponding identifier for the first queue to indicate that the first queue has been allocated, or the like. Optionally, the TM chip further sends a scheduling notification to the first scheduler, and the scheduling notification is used to instruct the first scheduler to start to schedule the first queue.

In another possible embodiment, the queue management instruction is a queue reclamation instruction, and the queue reclamation instruction includes the identifier of the first scheduler and the identifier of the first queue. The TM chip controls the first scheduler to stop scheduling the first queue, and reclaims the first queue to the queue resource pool. In an embodiment of an implementation process, the TM chip deletes the identifier of the first queue from the second queue list corresponding to the first scheduler, and indicates, in the first queue list, that the first queue is to be allocated. The indicating, in the first queue list, that the first queue is to be allocated may be adding the identifier of the first queue to the first queue list, or may be setting, in the first queue list, a corresponding identifier for the first queue to indicate that the first queue is to be allocated, or the like.

In another possible embodiment, the queue management instruction is a queue release instruction, and the queue release instruction includes the identifier of the first scheduler and the identifier of the first queue. The TM chip controls the first scheduler to temporarily stop scheduling the first queue. In an embodiment of an actual implementation process, the TM chip sends a release notification to the first scheduler, and the release notification is used to instruct the first scheduler to temporarily stop scheduling the first queue. Alternatively, the TM chip sets, in the second queue list corresponding to the first scheduler, a corresponding identifier for the first queue to instruct to temporarily stop scheduling. By controlling the first scheduler to temporarily stop scheduling the first queue, the TM chip releases the first queue when the first queue is temporarily not required to send data, and does not need to re-schedule the first queue from the queue resource pool when the first queue is required to send data again. This implements quick recovery of scheduling of the first queue, and helps save processing resources of the TM chip.

Optionally, the method provided in this embodiment further includes step 403 to step 405.

Step 403: The TM chip receives a packet from a network processor.

Step 404: The TM chip reads an identifier that is of a second queue and that is carried in the packet.

Step 405: The TM chip stores the packet to the second queue corresponding to a second scheduler.

After receiving a packet sent by a server in a wide area network, the network processor parses the packet to determine a second scheduler for sending the packet, searches a flow classification table of the second scheduler, to obtain an identifier that is of the second queue and that is corresponding to a data type of the packet, encapsulates the identifier of the second queue to the packet, and sends the packet to the TM chip. Each entry in the flow classification table includes a correspondence between a data type and an identifier of a queue, and the correspondence included in the flow classification table is adjustable. The data type is a type of data transmitted in a network by using a network device. Generally, data may be classified according to a network service type. For example, data of different types of network services such as a VoIP service, a VOD service, a BTV service, an HIS service, and a common Internet service is separately corresponding to different data types. Optionally, data may be classified according to a traffic type. For example, control data traffic and service data traffic are separately corresponding to different data types. Certainly, in another possible embodiment, a data type may be further classified with reference to the network service type and the traffic type. For example, data of different traffic types of a same service is separately corresponding to different data types.

That data is classified according to the network service type is used as an example. If it is assumed that the network device transmits a packet of an OTT video service, and a queue corresponding to the OTT video service recorded in the flow classification table is an AF4 queue, the network processor encapsulates an identifier of the AF4 queue to the packet, and then sends the encapsulated packet to the TM chip. The TM chip receives the packet sent by the network processor, reads the identifier that is of the AF4 queue and that is carried in the packet, and stores, according to the identifier of the AF4 queue, the packet to the AF4 queue scheduled by the second scheduler.

In conclusion, according to the queue management method provided in this embodiment, the TM chip receives the queue management instruction sent by the controller, and controls, according to the queue management instruction, scheduling of the first queue by the first scheduler. This resolves a prior-art problem caused when a fixed quantity of queues are allocated to each first-level scheduler during data scheduling by using an HQoS technology Because the multiple first-level schedulers in the TM chip schedule queues from a shared queue resource pool, queue allocation and the first-level schedulers are decoupled, and the first-level schedulers may schedule expected quantities of queues and expected types of queues according to an actual requirement from the shared queue resource pool. When a newly added type of data needs to be transmitted, a queue is scheduled from the shared queue resource pool. When there is an idle queue, the idle queue may be reclaimed to the shared queue resource pool. Therefore, the network device provided in this embodiment implements decoupling between queue allocation and the first-level schedulers, improves flexibility of queue allocation, and improves utilization of queue resources.

Figure 5:
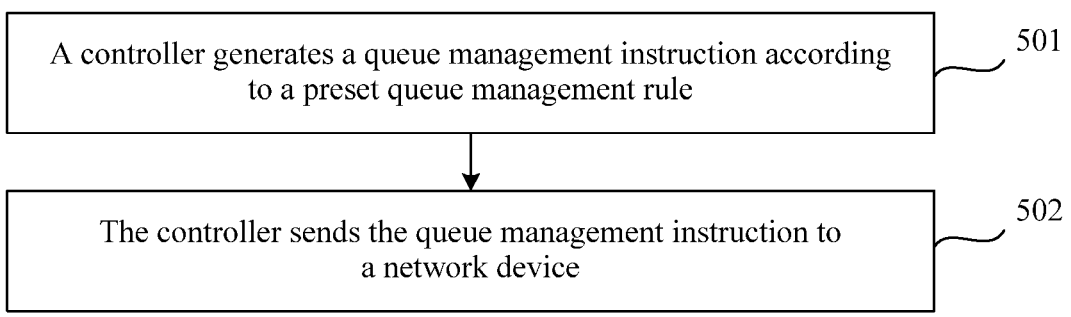
FIG. 5 is a flowchart of a queue management method according to another embodiment of this application.

Referring to FIG. 5, FIG. 5 shows a flowchart of a queue management method according to another embodiment of this application. The method is applied to the controller described in the embodiment shown in FIG. 3. For a structure of the controller, refer to the description in the embodiment shown in FIG. 3, and details are not described again in this embodiment. The method provided in this embodiment may include the following steps.

Step 501: A controller generates a queue management instruction according to a preset queue management rule.

The queue management instruction includes an identifier of a first scheduler and an identifier of a first queue, and the first scheduler is one of multiple first-level schedulers.

In a possible embodiment, the queue management instruction is a queue allocation instruction, and the queue allocation instruction includes the identifier of the first scheduler and the identifier of the first queue. Step 501 includes the following sub-steps:

1. The controller obtains a service request sent by user equipment UE.

2. The controller determines, according to a service requested in the service request, the first scheduler for sending a packet of the service.

3. The controller determines, according to a preset queue allocation rule, whether the first queue needs to be allocated to the first scheduler, where the first queue is used to store or send the packet.

4. If the first queue needs to be allocated to the first scheduler, the controller generates the queue allocation instruction.

In another possible embodiment, the queue management instruction is a queue reclamation instruction, and the queue reclamation instruction includes the identifier of the first scheduler and the identifier of the first queue. Step 501 includes the following sub-steps:

1. The controller receives information about queue usage of the first scheduler sent by the TM chip, where the queue usage of the first scheduler includes usage of each queue allocated to the first scheduler.

2. The controller detects, according to the queue usage of the first scheduler and a preset queue reclamation rule, whether the first queue that needs to be reclaimed exists.

3. If the first queue that needs to be reclaimed exists, the controller generates the queue reclamation instruction.

In another possible embodiment, the queue management instruction is a queue release instruction, and the queue release instruction includes the identifier of the first scheduler and the identifier of the first queue. Step 501 includes the following sub-steps:

1. The controller receives information about queue usage of the first scheduler sent by the TM chip, where the queue usage of the first scheduler includes usage of each queue allocated to the first scheduler.

2. The controller detects, according to the queue usage of the first scheduler and a preset queue release rule, whether the first queue that needs to be released exists.

3. If the first queue that needs to be released exists, the controller generates the queue release instruction.

Step 502: The controller sends the queue management instruction to a network device.

For description of the foregoing steps, refer to the description in the embodiment shown in FIG. 3, and details are not described again in this embodiment.

Figure 6A:
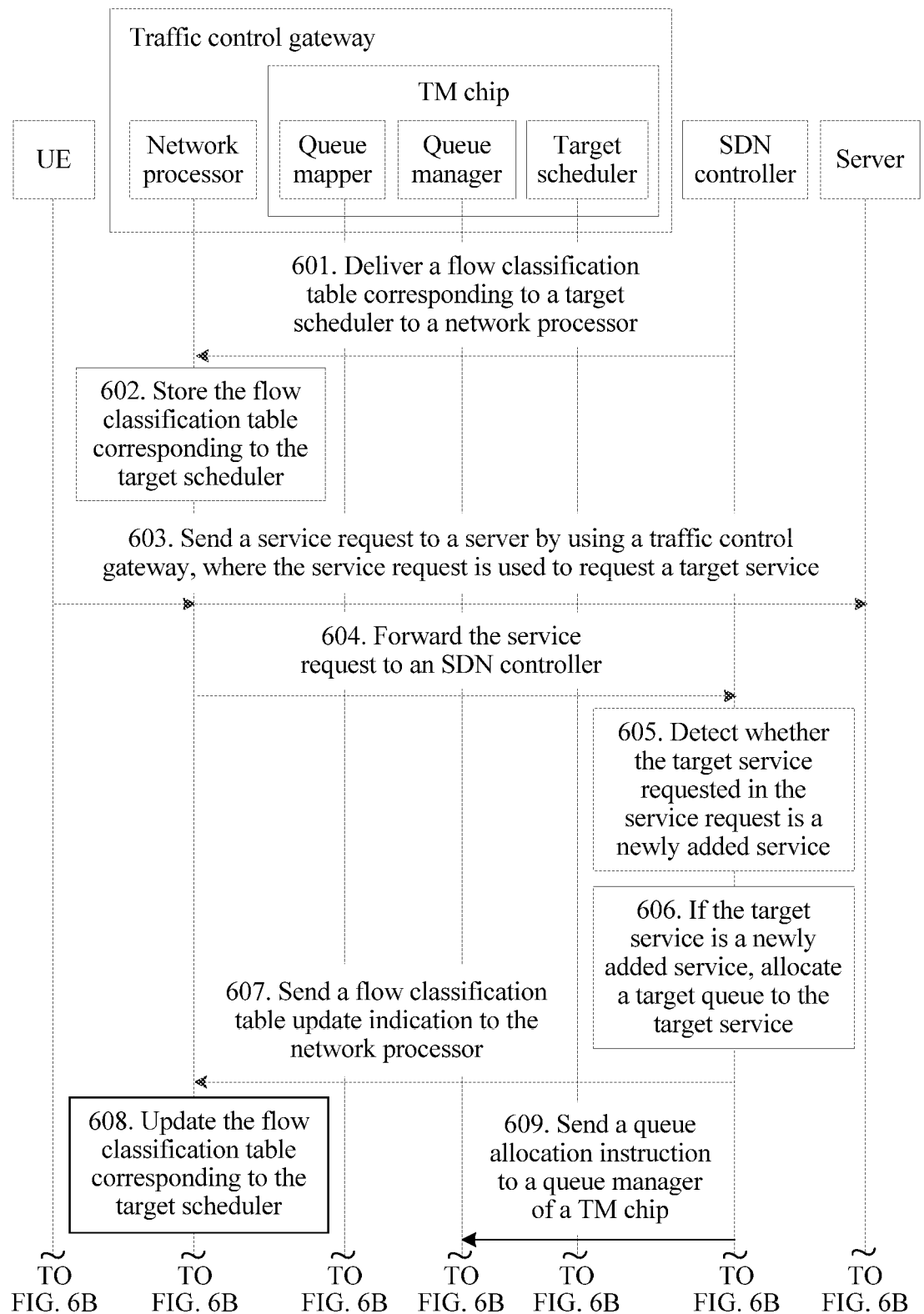
FIG. 6A and FIG. 6B are a flowchart of a queue allocation method according to an embodiment of this application.
Figure 6B:
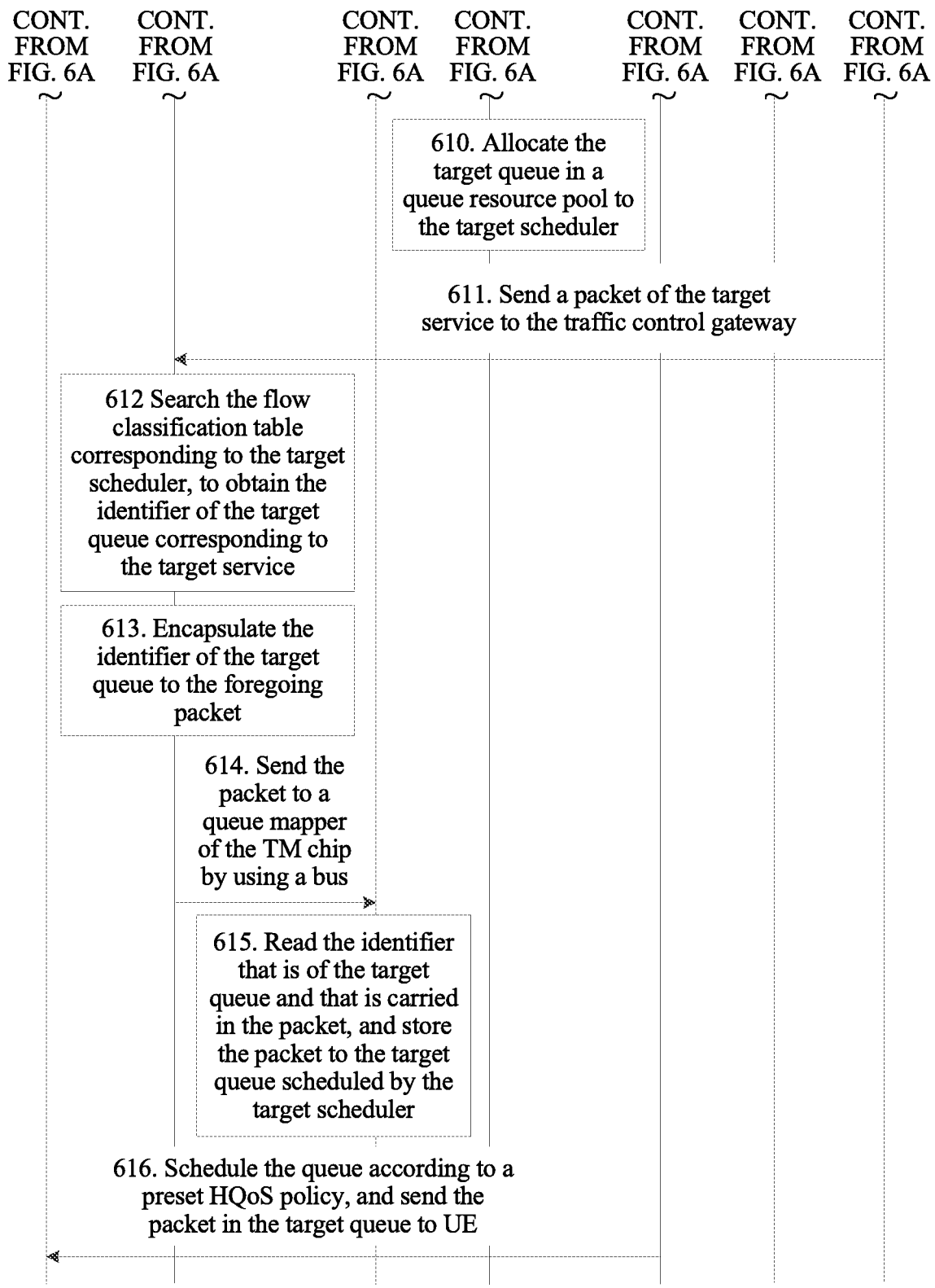

The following provides a queue allocation method by using a queue allocation process as an example. In the example, a network device is a traffic control gateway, and a controller is an SDN controller. The traffic control gateway includes a network processor and a TM chip. For a structure of the TM chip, refer to the description in the embodiment shown in FIG. 2A. As shown in FIG. 6A and FIG. 6B, the queue allocation method may include the following steps.

Step 601: The SDN controller pre-delivers a flow classification table corresponding to a target scheduler to the network processor.

For example, the pre-delivered flow classification table includes a correspondence between a common Internet service and a BE queue. The target scheduler is one of multiple first-level schedulers included in the TM chip.

Correspondingly, the network processor receives the flow classification table corresponding to the target scheduler from the SDN controller.

Step 602: The network processor stores the flow classification table corresponding to the target scheduler.

Step 603: The UE sends a service request to a server by using the traffic control gateway, where the service request is used to request a target service.

For example, the target service is an OTT video service.

Correspondingly, the server receives the service request sent by the UE.

Step 604: The network processor forwards the service request to the SDN controller.

Correspondingly, the SDN controller receives the service request forwarded by the network processor.

Step 605: The SDN controller detects whether the target service requested in the service request is a newly added service.

Step 606: If the target service is a newly added service, the SDN controller allocates a target queue to the target service.

The target queue is used to store or send a packet of the target service. For example, the SDN controller allocates an AF4 queue to the OTT video service, and the AF4 queue is used to store or send a packet of the OTT video service.

Step 607: The SDN controller sends a flow classification table update indication to the network processor.

The flow classification table update indication includes an identifier of the target scheduler, and a correspondence between an identifier of the target queue and an identifier of the target service.

Correspondingly, the network processor receives the flow classification table update indication sent by the SDN controller.

Step 608: The network processor updates the flow classification table corresponding to the target scheduler.

The network processor adds the correspondence between the identifier of the target queue and the identifier of the target network service to the flow classification table corresponding to the target scheduler. For example, the network processor adds a correspondence between the OTT video service and the AF4 queue to the flow classification table corresponding to the target scheduler.

Step 609: The SDN controller sends a queue allocation instruction to a queue manager of the TM chip.

The queue allocation instruction is used to instruct the queue manager to allocate the target queue to the target scheduler. The queue allocation instruction includes the identifier of the target scheduler and the identifier of the target queue.

Correspondingly, the queue manager of the TM chip receives the queue allocation instruction sent by the SDN controller.

Step 610: The queue manager of the TM chip allocates the target queue in a queue resource pool to the target scheduler.

For example, the TM chip takes the AF4 queue from the queue resource pool, and allocates the AF4 queue to the target scheduler.

Step 611: The server sends a packet of the target service to the traffic control gateway.

For example, the server sends the packet of the OTT video service to the traffic control gateway, and sends the packet of the OTT video service to the UE by using the traffic control gateway.

Correspondingly, the traffic control gateway receives the packet that is of the target service and that is sent by the server.

Step 612: The network processor searches the flow classification table corresponding to the target scheduler, to obtain the identifier of the target queue corresponding to the target service.

Step 613: The network processor encapsulates the identifier of the target queue to the foregoing packet.

Step 614: The network processor sends the packet to a queue mapper of the TM chip by using a bus.

Correspondingly, the queue mapper of the TM chip receives, by using the bus, the packet sent by the network processor.

Step 615: The queue mapper of the TM chip reads the identifier that is of the target queue and that is carried in the packet, and stores the packet to the target queue scheduled by the target scheduler.

Step 616: The target scheduler of the TM chip schedules the queue according to a preset HQoS policy, and sends the packet in the target queue to the UE.

Correspondingly, the UE receives the packet sent by the traffic control gateway.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A network device comprising:
a traffic management (TM) chip comprising N levels of schedulers, each $(i+1)^{th}$-level scheduler is configured to schedule multiple $i^{th}$-level schedulers, each first-level scheduler is configured to schedule multiple queues, N is an integer greater than 1, and i is an integer greater than or equal to 1 and less than N;
a first communications interface, configured to receive a queue management instruction sent by a controller, wherein the queue management instruction comprises an identifier of a first scheduler and an identifier of a first queue, and the first scheduler is one of multiple first-level schedulers; and
the TM chip is configured to control, according to the queue management instruction, scheduling of the first queue by the first scheduler, wherein
a queue scheduled by the first scheduler belongs to a queue resource pool of the TM chip, and the queue resource pool comprises at least one to-be-allocated queue.

2. The network device according to claim 1, wherein the queue management instruction is a queue allocation instruction; and
the TM chip is configured to allocate the first queue in the queue resource pool to the first scheduler.

3. The network device according to claim 1, wherein the queue management instruction is a queue reclamation instruction; and
the TM chip is configured to: control the first scheduler to stop scheduling the first queue, and reclaim the first queue to the queue resource pool.

4. The network device according to claim 1, wherein the queue management instruction is a queue release instruction; and
the TM chip is configured to control the first scheduler to temporarily stop scheduling the first queue.

5. The network device according to claim 1, wherein the network device further comprises a network processor configured to:
receive a packet sent by a server in a wide area network,
parse the packet to determine a second scheduler for sending the packet, wherein the second scheduler is one of the multiple first-level schedulers,
search a flow classification table of the second scheduler, to obtain an identifier that is of the second queue and that is corresponding to a data type of the packet;
encapsulate the identifier of the second queue to the packet, and
send the packet to the TM chip, wherein each entry in the flow classification table comprises a correspondence between a data type and an identifier of a queue; and
wherein the TM chip is further configured to: read the identifier that is of the second queue and that is carried in the packet, and store the packet to the second queue.

6. A controller, wherein the controller is configured to control a network device to manage a queue, the network device comprises a first communications interface and a traffic management (TM) chip, and the TM chip comprises N levels of schedulers, each $(i+1)^{th}$-level scheduler is configured to schedule multiple $i^{th}$-level schedulers, each first-level scheduler is configured to schedule multiple queues, N is an integer greater than 1, and i is an integer greater than or equal to 1 and less than N, the controller comprising:
a processor configured to generate a queue management instruction according to a preset queue management rule, wherein the queue management instruction comprises an identifier of a first scheduler and an identifier of a first queue, and the first scheduler is one of multiple first-level schedulers; and
a second communications interface configured to send the queue management instruction to the network device, wherein
a queue scheduled by the first scheduler belongs to a queue resource pool of the TM chip, and the queue resource pool comprises at least one to-be-allocated queue.

7. The controller according to claim 6, wherein the queue management instruction is a queue allocation instruction; and
the processor is configured to: obtain a service request sent by user equipment (UE); determine, according to a service requested in the service request, the first scheduler for sending a packet of the service; determine, according to a preset queue allocation rule, whether the first queue is to be allocated to the first scheduler, wherein the first queue is used to store or send the packet; and if the first queue is to be allocated to the first scheduler, generate the queue allocation instruction, wherein the queue allocation instruction comprises the identifier of the first scheduler and the identifier of the first queue.

8. The controller according to claim 6, wherein the queue management instruction is a queue reclamation instruction;
the second communications interface is further configured to receive information about queue usage of the first scheduler sent by the TM chip, wherein the queue usage of the first scheduler comprises usage of each queue allocated to the first scheduler; and
the processor is configured to: detect, according to the queue usage of the first scheduler and a preset queue reclamation rule, whether the first queue that is to be reclaimed exists; and if the first queue that is to be reclaimed exists, generate the queue reclamation instruction, wherein the queue reclamation instruction comprises the identifier of the first scheduler and the identifier of the first queue.

9. The controller according to claim 6, wherein the queue management instruction is a queue release instruction;
the second communications interface is further configured to receive information about queue usage of the first scheduler sent by the TM chip, wherein the queue usage of the first scheduler comprises usage of each queue allocated to the first scheduler; and
the processor is configured to: detect, according to the queue usage of the first scheduler and a preset queue release rule, whether the first queue that is to be released exists; and if the first queue that is to be released exists, generate the queue release instruction, wherein the queue release instruction comprises the identifier of the first scheduler and the identifier of the first queue.

10. A queue management method, wherein the method is applied to a traffic management (TM) chip, and the TM chip comprises N levels of schedulers, each $(i+1)^{th}$-level scheduler is configured to schedule multiple $i^{th}$-level schedulers, each first-level scheduler is configured to schedule multiple queues, N is an integer greater than 1, and i is an integer greater than or equal to 1 and less than N, the method comprising:
receiving a queue management instruction sent by a controller, wherein the queue management instruction comprises an identifier of a first scheduler and an identifier of a first queue, and the first scheduler is one of multiple first-level schedulers; and
controlling, according to the queue management instruction, scheduling of the first queue by the first scheduler, wherein
a queue scheduled by the first scheduler belongs to a queue resource pool of the TM chip, and the queue resource pool comprises at least one to-be-allocated queue.

11. The method according to claim 10, wherein the queue management instruction is a queue allocation instruction; and
the controlling, according to the queue management instruction, scheduling of the first queue by the first scheduler comprises:
allocating the first queue in the queue resource pool to the first scheduler.

12. The method according to claim 10, wherein the queue management instruction is a queue reclamation instruction; and the controlling, according to the queue management instruction, scheduling of the first queue by the first scheduler comprises:
controlling the first scheduler to stop scheduling the first queue, and reclaiming the first queue to the queue resource pool.

13. The method according to claim 10, wherein the queue management instruction is a queue release instruction; and
the controlling, according to the queue management instruction, scheduling of the first queue by the first scheduler comprises:
controlling the first scheduler to temporarily stop scheduling the first queue.

14. The method according to claim 10, wherein the method further comprises:
receiving a packet from a network processor, wherein the packet is sent by a server in a wide area network to the network processor;
reading an identifier that is of a second queue and that is carried in the packet, wherein the identifier of the second queue is obtained by the network processor by searching, after determining, by parsing the packet, a second scheduler for sending the packet, a flow classification table of the second scheduler according to a data type of the packet, and is encapsulated to the packet by the network processor, the second scheduler is one of the multiple first-level schedulers, and each entry in the flow classification table comprises a correspondence between a data type and an identifier of a queue; and
storing the packet to the second queue.

15. A traffic management (TM) chip, wherein the TM chip comprises N levels of schedulers, each $(i+1)^{th}$-level scheduler is configured to schedule multiple $i^{th}$-level schedulers, each first-level scheduler is configured to schedule multiple queues, N is an integer greater than 1, and i is an integer greater than or equal to 1 and less than N, the TM chip comprising:
a first interface, configured to receive a queue management instruction sent by a controller, wherein the queue management instruction comprises an identifier of a first scheduler and an identifier of a first queue, and the first scheduler is one of multiple first-level schedulers; and
a queue manager, configured to control, according to the queue management instruction, scheduling of the first queue by the first scheduler, wherein
a queue scheduled by the first scheduler belongs to a queue resource pool of the TM chip, and the queue resource pool comprises at least one to-be-allocated queue.

16. The TM chip according to claim 15, wherein the queue management instruction is a queue allocation instruction; and
the queue manager is configured to allocate the first queue in the queue resource pool to the first scheduler.

17. The TM chip according to claim 15, wherein the queue management instruction is a queue reclamation instruction; and
the queue manager is configured to: control the first scheduler to stop scheduling the first queue, and reclaim the first queue to the queue resource pool.

18. The TM chip according to claim 15, wherein the queue management instruction is a queue release instruction; and the queue manager is configured to control the first scheduler to temporarily stop scheduling the first queue.

19. The TM chip according to claim 15, wherein the TM chip further comprises:
a second interface, configured to receive a packet from a network processor, wherein the packet is sent by a server in a wide area network to the network processor; and
a queue mapper, configured to: read an identifier that is of a second queue and that is carried in the packet, wherein the identifier of the second queue is obtained by the network processor by searching, after determining, by parsing the packet, a second scheduler for sending the packet, a flow classification table of the second scheduler according to a data type of the packet, and is encapsulated to the packet by the network processor, the second scheduler is one of the multiple first-level schedulers, and each entry in the flow classification table comprises a correspondence between a data type and an identifier of a queue; and
the queue mapper is further configured to store the packet to the second queue corresponding to the second scheduler.

* * * * *